(12) United States Patent
Kent

(10) Patent No.: US 7,421,576 B1
(45) Date of Patent: Sep. 2, 2008

(54) INTERCEPTION AND MODIFICATION OF NETWORK AUTHENTICATION PACKETS WITH THE PURPOSE OF ALLOWING ALTERNATIVE AUTHENTICATION MODES

(75) Inventor: Alexander Dale Kent, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 784 days.

(21) Appl. No.: 10/345,265

(22) Filed: Jan. 16, 2003

(51) Int. Cl.
*H04L 9/00* (2006.01)
(52) U.S. Cl. .................. 713/155; 713/153; 713/168; 380/277
(58) Field of Classification Search .......... 713/155, 713/156, 168; 380/277
See application file for complete search history.

(56) References Cited

U.S. PATENT DOCUMENTS

| | | | |
|---|---|---|---|
| 5,586,260 A | 12/1996 | Hu .................. 395/200.2 |
| 5,590,199 A | 12/1996 | Krajewski, Jr. et al. ....... 380/25 |
| 5,814,871 A * | 9/1998 | Furukawa et al. ........... 257/433 |
| 5,841,871 A * | 11/1998 | Pinkas ....................... 713/155 |
| 6,003,136 A | 12/1999 | Schanze ..................... 713/201 |
| 6,055,639 A | 4/2000 | Schanze ..................... 713/201 |
| 6,301,661 B1 | 10/2001 | Shambroom ................. 713/168 |
| 6,405,312 B1 | 6/2002 | Ly .............................. 713/155 |
| 6,411,309 B1 | 6/2002 | Ly .............................. 345/733 |
| 6,449,651 B1 * | 9/2002 | Dorfman et al. ............ 709/229 |
| 2001/0014945 A1 * | 8/2001 | Muschenborn .............. 713/201 |
| 2002/0159601 A1 * | 10/2002 | Bushmitch et al. .......... 380/277 |
| 2003/0041093 A1 * | 2/2003 | Yamane et al. .............. 709/201 |
| 2004/0003287 A1 * | 1/2004 | Zissimopoulos et al. .... 713/201 |
| 2004/0015725 A1 * | 1/2004 | Boneh et al. ................ 713/201 |

OTHER PUBLICATIONS

Steiner, J.G., Neuman, C. and Schiller, J. I., "An Authentication Service for Open Network Systems", Cisco, Jul. 19, 2001; http://www.cisco.com/warp/public/106/1.html.

* cited by examiner

*Primary Examiner*—Kambiz Zand
*Assistant Examiner*—Jason K Gee
(74) *Attorney, Agent, or Firm*—Thomas S. O'Dwyer; James C. Durkis; Paul A. Gottlieb

(57) ABSTRACT

Methods and systems in a data/computer network for authenticating identifying data transmitted from a client to a server through use of a gateway interface system which are communicatively coupled to each other are disclosed. An authentication packet transmitted from a client to a server of the data network is intercepted by the interface, wherein the authentication packet is encrypted with a one-time password for transmission from the client to the server. The one-time password associated with the authentication packet can be verified utilizing a one-time password token system. The authentication packet can then be modified for acceptance by the server, wherein the response packet generated by the server is thereafter intercepted, verified and modified for transmission back to the client in a similar but reverse process.

20 Claims, 4 Drawing Sheets

INTERCEPTION AND MODIFICATION OF NETWORK AUTHENTICATION PACKETS WITH THE PURPOSE OF ALLOWING ALTERNATIVE AUTHENTICATION MODES

STATEMENT OF GOVERNMENT INTEREST

The invention described herein may be manufactured and used by or for the United States Government for Governmental purposes without the payment of any royalties.

TECHNICAL FIELD

The present invention is generally related to computer network security methods and systems. The present invention is also related to Kerberos authentication methods and systems. The present invention is additionally related to methods for authenticating computer network users.

BACKGROUND OF THE INVENTION

A continuing need exists for privacy and authentication in computer networks. The ability to properly authenticate a computer network user, for example, is one of the foremost areas of concern involved in computer network security. Various authentication schemes have been created to address computer network security needs. One scheme that has recently gained a great deal of use is the Kerberos security system, including related Kerberos protocols and software. Kerberos is a network authentication protocol that was designed to provide strong authentication for client/server applications by using secret-key cryptography. The Kerberos security system is generally utilized today as a developing standard for authenticating computer network users, because it can operate in a multi-vendor network and does not require the transmission of passwords over the computer network.

Kerberos functions as a means for authenticating users. A Kerberos software package implemented in the context of a data network (e.g., a computer network) can determine if a user is in fact a valid network user. It does not provide other security services such as audit trails. Kerberos authentication is based on "passwords" and does not involve physical location or smart cards. In order to implement Kerberos in a computer network, each computer in a network must run Kerberos software. Kerberos works by granting a "ticket," which can then be honored by all network computers running the Kerberos protocol. Such tickets can be encrypted, so that passwords do not pass over the network in "clear text" and additionally, so that the users are not required to enter their password when accessing a different computer.

Kerberos protocols find particularly useful applications in association with the Internet, a computer network well known in the computer networking arts. Because the Internet, including many internal organization "Intranet" networks, generally operate via insecure network environments, many of the protocols utilized in the Internet (including "Intranets") do not provide any security. Tools to "sniff" passwords off of a computer network are commonly utilized by malicious hackers. Applications, which send an unencrypted password over a computer network (e.g., Internet and/or Intranet), are very vulnerable to undesirable network intrusions.

Many computer network designers, including designers of so-called "web sites" often utilize "firewalls" to solve their network security problems. A firewall, well-known in networking and computer arts is generally a security module that protects an organization's network (e.g., an Intranet) against external threats, such as hackers, coming from another network, such as the Internet. Firewalls prevent computers or other computing devices within a particular network from communicating directly with computers or other devices external to the network and vice versa. Instead, all communications are generally routed through a proxy server outside of the organizational network, and the proxy server determines if it may be safe to let a particular message or data pass through to the network.

Unfortunately, firewalls assume that malicious hackers, for example, operate external to the computer network, which is essentially a flawed assumption. Insiders carry out many particularly egregious and damaging incidents of computer crime. Firewalls also have a significant disadvantage in that they restrict how a user is able to function within the network environment. Kerberos was thus created as a solution to these network security problems. The Kerberos protocol uses strong cryptography so that a client can prove its identity to a server (and vice versa) across an insecure network connection. After a client and server have utilized Kerberos to prove their identity, all communications thereafter can be encrypted to assure privacy and data integrity.

The present invention was created as a solution for integrating a one-time password system (e.g., CRYPTO Cards) into an institution-Wide Windows® desktop. With the advent of modern operating systems such as, for example, Windows 2000®, many operating systems have moved from proprietary-based authentication schemes to the more standard Kerberos system. Because many institutions have utilized Kerberos in UNIX environments for a number of years, many one-time passwords have been integrated into UNIX-based Kerberos protocols. A number of schemes have been considered for integrating one-time passwords with Microsoft's version of Kerberos, for example including the use of a UNIX Kerberos server, cross-realm trusts between UNIX and Microsoft® servers, modifying a Microsoft® system or server, and the replacement of end-user authentication interfaces. The present inventor has determined that all of these solutions are either technically unfeasible or too difficult to implement.

Based on the foregoing, the present inventor has concluded that a need exists for an improved method and system for authenticating users without the aforementioned drawbacks. The present inventor believes that an improved authentication scheme can be designed and implemented which involves the interception of network-level Kerberos authentication packages. Such an improved authentication scheme, including methods and systems thereof, are thus disclosed herein.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide an improved computer network access method and system.

It is another aspect of the present invention to provide a method and system for intercepting and modifying computer network-level Kerberos authentication packets.

It is yet another aspect of the present invention for verifying the integrity of intercepted network-level Kerberos authentication packets with a secondary authentication scheme.

The above and other aspects can be achieved as will now be further summarized. Methods and systems can be implemented in a computer network for authenticating identifying data transmitted from a client to a server. An authentication packet transmitted from a client to a server over a data network can be intercepted and encrypted with a one-time password for transmission from a client to a server, which in turn generates a response packet for transmission back to the client. The one one-time password associated with the authentication packet can be verified utilizing an arbitrary one-time password token system. The authentication packet can then be modified for acceptance by the server. The response packet generated by the server can thereafter be intercepted, verified and modified for transmission back to the client in a similar, but reverse process.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
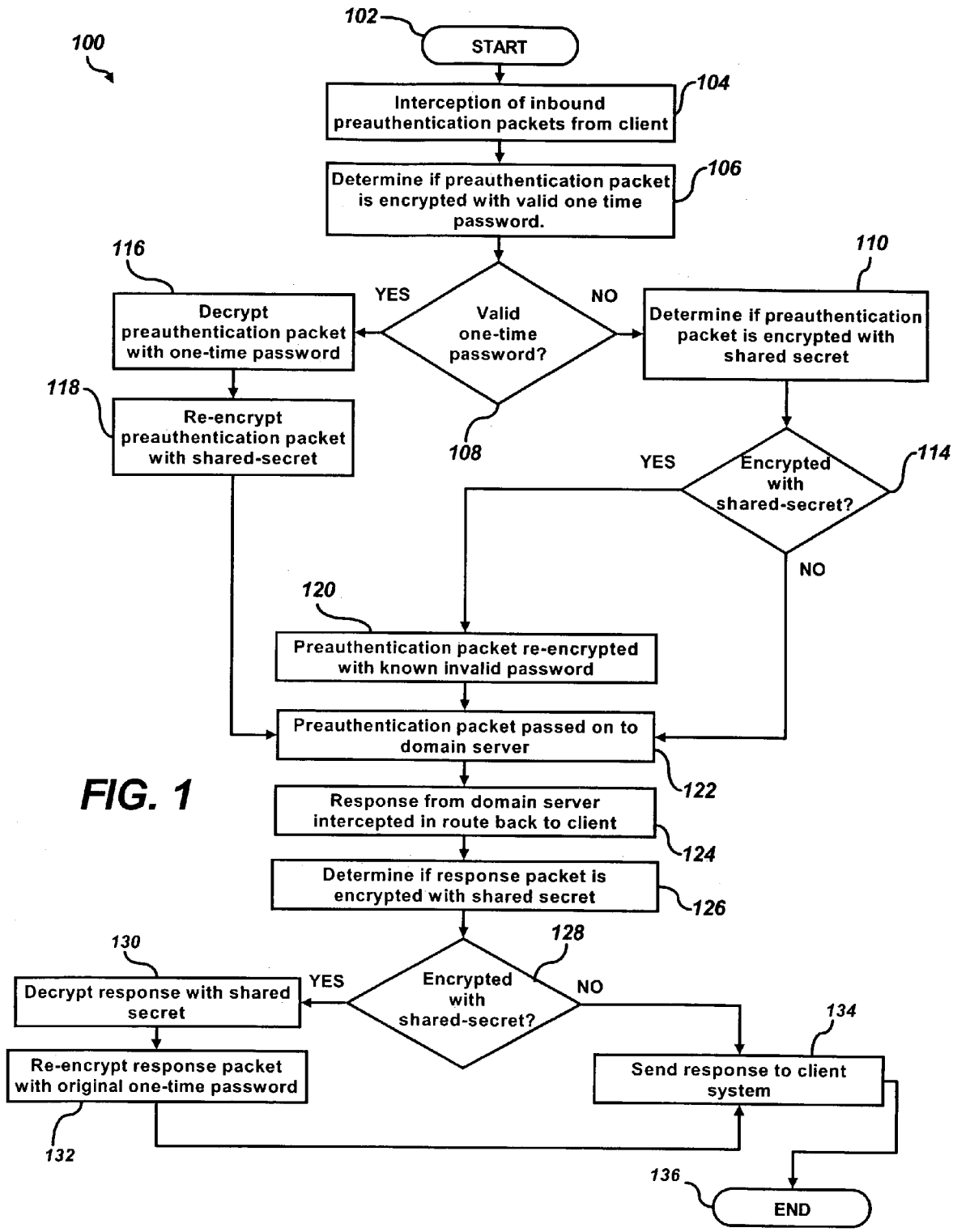
FIG. 1 illustrates a high-level flow chart of operations depicting logical operational steps that can be implemented in accordance with a preferred embodiment of the present invention.
Figure 2:
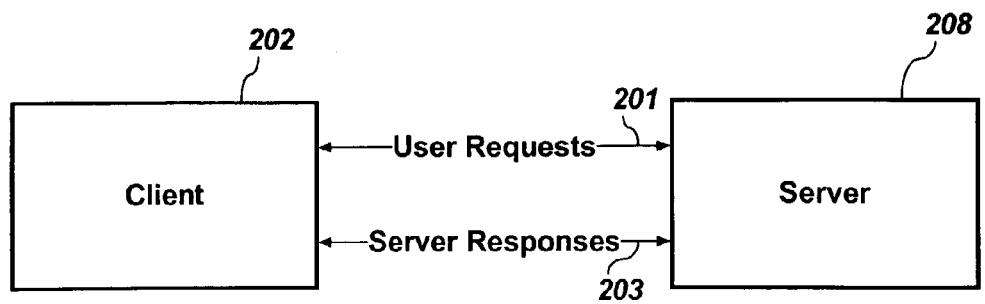
FIG. 2 illustrates a detailed block diagram of a client/server architecture in which a preferred embodiment of the present invention can be implemented.

FIG. 1 illustrates a high-level flow chart 100 of operations depicting logical operational steps that can be implemented in accordance with a preferred embodiment of the present invention. The present invention disclosed herein was developed to intercept Kerberos authentication packets, specifically the Ticket Granting Tickets (TGTs) requests and preauthentication packets bound from client machines (e.g., desktop computers linked to a data network) to a domain server (e.g., a Windows domain server) and back. Note that an example of a client is illustrated in FIG. 2 as client 202, which is described in greater detail herein with respect to a data network 201.

The process can be initiated as depicted at block 102. Thereafter, as illustrated at block 104, one or more inbound preauthentication packets can be intercepted from the client.

Next, a one-time password (OTP) utilized to encrypt the inbound preauthentication packet from a group of valid one-time passwords presented from the one-time authentication server can be determined, as illustrated at block 106. A decision can then be made, as illustrated at decision block 108, determining if a valid one-time password was found.

If the valid one-time password is found, as indicated at decision block 108, the packet can be decrypted with the one-time password as indicated at block 116. The preauthentication packet can then be re-encrypted with a known valid password. Note that such a known valid password is the password that is expected by the domain server as a valid password for a given user. Following encryption with a known valid password, the packet is then passed on to the domain server. This valid password is usually only known between the system doing the modification and the domain server, and is therefore referred to as a shared secret. Following processing of the operation illustrated at block 116, the preauthentication packet can be re-encrypted with the shared secret, as indicated at block 118.

If, however, a valid one-time password was not found, as illustrated at decision block 108, then as illustrated at block 110, a determination can be made whether or not the originating preauthentication packet is encrypted with a known valid shared secret. Note that this shared secret may be the same shared secret indicated at block 118, given a different process path. If it is determined, as indicated at block 114 that the preauthentication packet has been encrypted with a valid shared secret, then the operation illustrated at block 120 can be performed, wherein the preauthentication packet is encrypted with a known invalid password. This process allows, if desired, the assurance that the originating client cannot use the shared secret between the system doing the modification and the domain server. If it is determined, however, as illustrated at block 114, that the preauthentication packet has not been encrypted with the shared secret, then the operation depicted at block 122 is performed.

Thus, described thereafter at block 122, the preauthentication packet in its modified or unmodified state is passed on to the domain server. As indicated next at block 124, the response from the domain server can be intercepted in route back to the client. Thereafter, a determination can be made whether or not the response packet is encrypted with the valid shared secret. As indicated at decision block 128, such a determination is processed. If the response packet is encrypted with the shared secret, then the response with the shared secret is decrypted, as indicated at block 130.

Following processing of the operation illustrated at block 130, the response packet is re-encrypted with the original one-time password, as depicted at block 132. The response packet can then be forwarded to the client system, as indicated at block 134. If the response packed is not encrypted with the shared secret, then the response packet is simply sent to the client system, as illustrated at block 134. The process then terminates, as depicted at block 136.

The corresponding response packet from the domain server can also be intercepted in route back to the client. It can contain the requested TGT encrypted with the previously utilized shared secret. The system can decrypt the packet with the shared secret and can then encrypt it with the original one-time password initially utilized by the client system in the preauthentication packet before sending it on to the client system. All other Kerberos-related and unrelated server traffic is left unmodified.

It can be appreciated by those skilled in the art that the methodology described with respect to FIG. 1 can be implemented as a program product (i.e., computer program product) composed of one or more modules. The term "module" as utilized herein thus generally refers to a software module. In the computer programming arts, a module can be implemented as a collection of routines and data structures that performs particular tasks or implements a particular abstract data type. Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the present inventor is generally referring to such software modules or implementations thereof. The methodology illustrated in FIG. 1 for example, can be implemented as a series of modules. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media include: recordable-type media, such as floppy disks, hard disk drives, CD ROMs, CD-Rs, etc., and transmission media, such as digital and/or analog communication links. Examples of transmission media also include devices such as modems, which permit digitized information to be transmitted over standard telephone lines and/or the more advanced digital communications lines. The present invention can thus be implemented as a program product composed of a plurality of modules, which can be interactively displayed for a user on a display screen of a data-processing system (e.g., a computer). Such interactivity may be provided by a graphical user interface (GUI), which is well known in the art, including Internet browser applications thereof.

Figure 3:
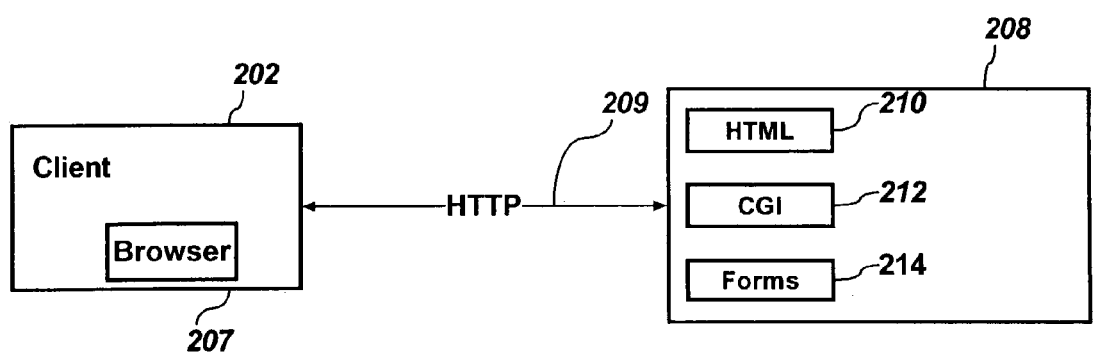
FIG. 3 depicts a detailed block diagram of the client/server architecture depicted in FIG. 2.
Figure 4:
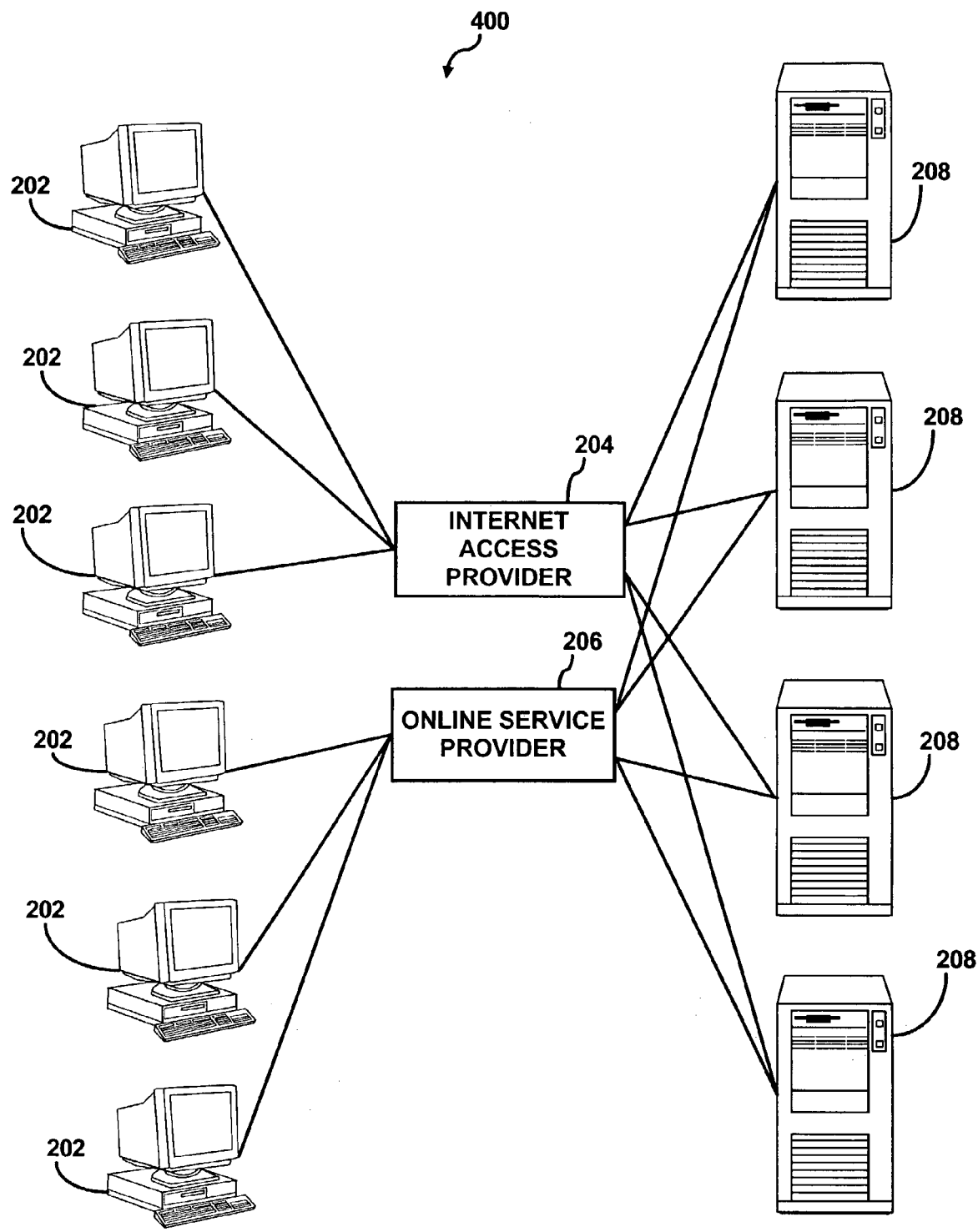
FIG. 4 depicts a block diagram illustrative of a computer network in which a preferred embodiment of the present invention can be implemented.

FIG. 2 illustrates a detailed block diagram of a client/server architecture in which a preferred embodiment of the present invention can be implemented. FIG. 3 depicts a detailed block diagram of the client/server architecture depicted in FIG. 2. Note that in FIGS. 2, 3 and 4 depicted and described herein, like parts are generally indicated by identical reference numerals. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated. Thus, a client/server architecture, such as that depicted in FIGS. 2, 3 and 4 herein is presented for illustrative purposes only and is not considered a limiting feature of the present invention. It is anticipated that other types of data networks, such as the Distributed Computing Environment (DCE) for example, can utilize the present invention disclosed herein.

As indicated in FIGS. 2 and 3, client 202 and server 208 can communicate utilizing the functionality provided by HTTP. Active within client 202 is a first process, browser 207, which establishes connections with server 208, and presents information to the user. Any number of commercially or publicly available browsers can be utilized in various implementations in accordance with the preferred embodiment of the present invention. For example, a browser such as Netscape® can provide the functionality specified under HTTP.

User requests 201 for data are transmitted by a client application program to a server 208. Server 208 can be, for example, a remote computer system accessible over the Internet or other communication networks. Note that the term "Internet" as utilized herein is well known in the art and refers generally to the worldwide collection of gateways and networks that utilize the TCP/IP suite of protocols to communicate with one another. The term "intranet," on the other hand, refers to a network designed for information processing within a particular company or organization that employs applications associated with the Internet, such as Web pages, Web browsers, and so forth, but which are accessible only to those within the company or organization.

Server 208 generally performs scanning and searching of raw (e.g., unprocessed) information sources (e.g., newswire feeds or news groups) and, based upon these user requests, presents the filtered electronic information as server responses 203 to the client process. The client process may be active in a first computer system, and the server process may be active in a second computer system, communicating with one another over a communications medium, thus providing distributed functionality and allowing multiple clients to take advantage of the information-gathering capabilities of the server.

Server 208 executes the corresponding server software, which presents information to the client in the form of HTTP responses 209. The HTTP responses 209 correspond with the Web pages represented using HTML, or other data generated by server 208. Server 208 provides HTML 210. With certain browsers, a Common Gateway Interface (CGI) 212 is also provided, which allows the client program to direct server 208 to commence execution of a specified program contained within server 208. This may include a search engine that scans received information in the server for presentation to the user controlling the client.

By utilizing this interface, and HTTP responses 209, server 208 may notify the client of the results of that execution upon completion. Common Gateway Interface (CGI) 212 is one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 214), which can be provided by some browsers, such as the Netscape-brand browser described herein. This functionality allows the user via a client application program to specify terms in which the server causes an application program to function (e.g., terms or keywords contained in the types of stories/articles, which are of interest to the user). This functionality is an integral part of the search engine.

FIG. 4 depicts a block diagram 400 illustrative of a data network 201 in which a preferred embodiment of the present invention can be implemented. Data network 201 can be representative of the Internet, which can be described as a known data network based on the client-server model discussed herein. Conceptually, the Internet includes a large network of servers 208 that are accessible by clients 202, typically users of personal computers, through some private Internet access provider 204 (e.g., an internal company Intranet) or an on-line service provider 206 (e.g., such as America Online, Prodigy, Juno, and the like). Each of the clients 202 may run a browser to access servers 208 via the access providers. Each server 208 operates a so-called "web site" that supports files in the form of documents and web pages. A Universal Resource Locator (URL) having a known syntax for defining a network collection can identify a network path to servers 208. Data network 200 can thus be considered a web-based computer network. Note that a server, such as server 208, can be configured to function as a domain server (e.g., a Windows domain server). Thus, one or more servers 208 can function as a preauthentication server in accordance with a preferred embodiment of the present invention.

Figure 5:
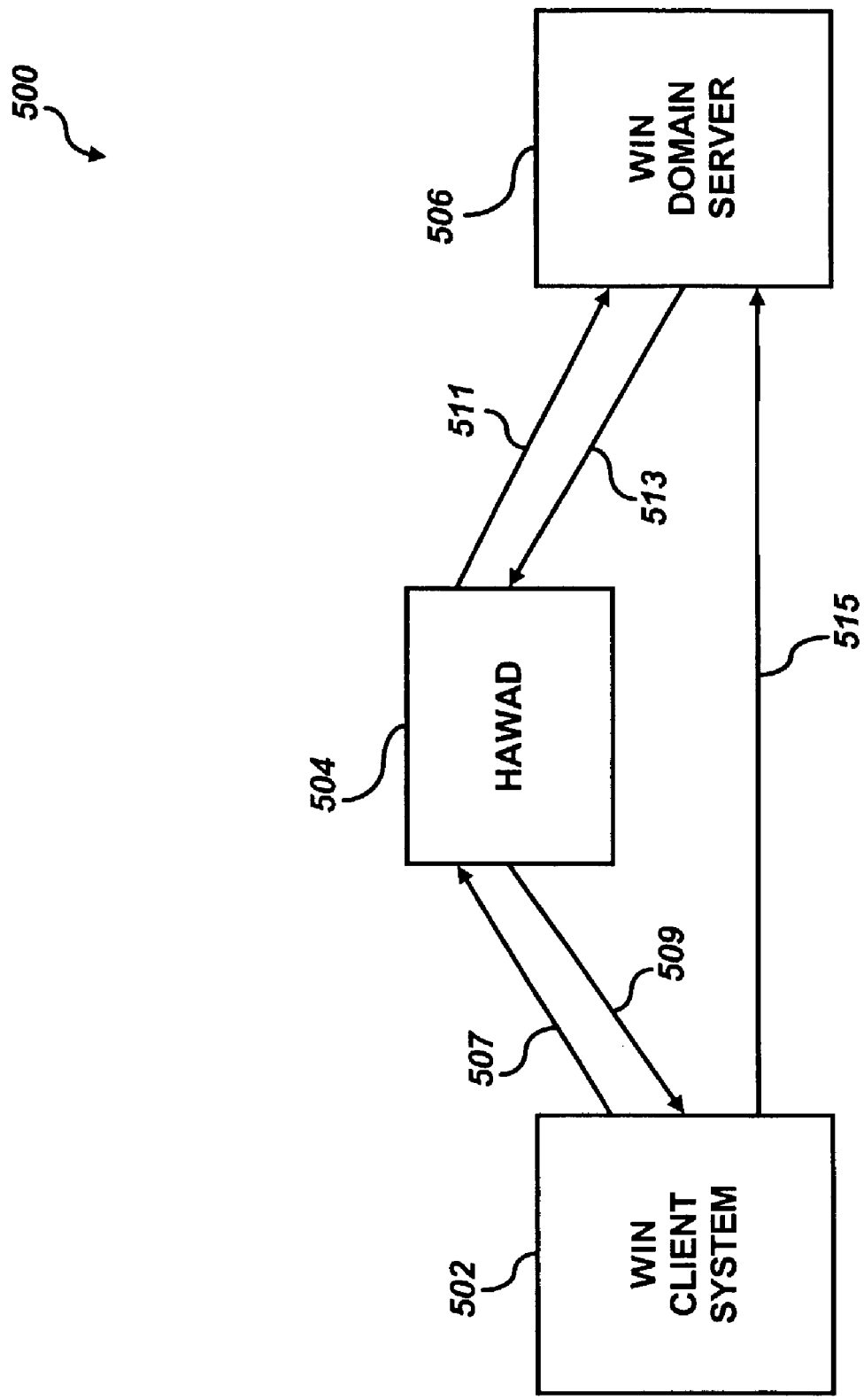
FIG. 5 illustrates a high-level block diagram of a password authentication system, which can be implemented in accordance with a preferred embodiment of the present invention.

FIG. 5 illustrates a high-level block diagram 500 of a password authentication system, which can be implemented in accordance with a preferred embodiment of the present invention. A client system 502 can communicate with an interface 504, which is labeled "HAWAD" in FIG. 5. It should be understood by one who is skilled in the an that the gateway interface system 504 is comprised of at least an authentication server, including but not limited to an OTP system with necessary protocol translation programs, which may be coupled to a Kerberos key distribution center. Interface 504 can in turn communicate with a domain server 506 (e.g., a Windows domain server). Arrow 507 located between client system 502 and interface 504 indicates the transfer of a preauthentication packet encrypted with a passcode. Such a transfer takes place from client system 502 to interface 504. Arrow 511 indicates the transfer of the preauthentication packet from the interface 504 to domain server 506, such that the preauthentication packet is encrypted within a windows password. Arrow 513 indicates the transfer of a TGT packet from domain server 506 to interface 504. According to the operation illustrated by arrow 513, the TGT packet is encrypted with a windows password. Similarly, arrow 509 represents the transfer of a TGT packet encrypted with a passcode. Transfer takes place between interface 504 and client system 502. Arrow 5015 represents the fact that all other AD/Kerberos traffic remains unmodified.

Based on the foregoing, it can be appreciated that the present invention represents an advancement over the prior art. Currently, the only available technology provided by one-time password vendors for integration with Windows authentication requires the modification and/or replacement of the user authentication interface on each desktop or server system. Such a solution can be highly intrusive in large-scale deployment. The technology disclosed herein does not require modification of any system.

The most significant application of the present invention is the integration of one-time password systems with Kerberos-based authentication systems in a non-intrusive manner. Immediate applications include the integration of any one-time password system (e.g., CRYPTO Card, SecurID, etc.) with Kerberos. Those skilled in the art can appreciate, however, that the present invention can be applied to other networks and systems. For example, the present invention can be integrated with a Distributed Computing Environment (DCE) authentication system, which is also based upon Kerberos, and which is heavily utilized by supercomputing facilities, such as, for example Los Alamos National Laboratory in Los Alamos, N. Mex. Essentially, all vendors of one-time password systems will significantly benefit through applications of the present invention.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration only. Other variations and modifications of the present invention will be apparent to those of skill in the art. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A method in a data network for authenticating identifying data transmitted from a client to a domain server through use of a gateway interface system which are communicatively coupled to each other, said method comprising the steps of:
   intercepting an authentication packet transmitted from a client to a domain server by the gateway interface, wherein said authentication packet is symmetrically encrypted by the client with a one-time password for transmission from said client to said domain server;
   verifying said one-time password associated with said authentication packet by the gateway interface based upon a plurality of preassigned one-time passwords either cached or accessed from at least one authentication server; and
   modifying said authentication packet by the gateway interface for acceptance by said domain server, wherein the response packet that is generated by said domain server is thereafter intercepted, verified and modified by said gateway interface for transmission back to the client.

2. The method of claim 1 wherein the step of modifying said authentication packet by the gateway interface, further comprises the steps of:
   encrypting said authentication packet with a valid password to establish a protected transmission for the transfer of known security information as necessary to identify the client and permit access to said domain server.

3. The method of claim 1 further comprising the step of:
   encrypting said authentication packet with a known invalid password for transfer to said domain server, if said one-time password utilized by the client is not identified by the gateway interface, such that said domain server generates an error message indicative of said invalid password for transmission back to client.

4. The method of claim 2 wherein the step of encrypting said authentication packet with a valid password for transfer to said domain server involves encryption with a shared secret that is expected by such server as a valid password for a given client.

5. A method in a local area network for authenticating identifying data transmitted from a client to an intranet server through use of a gateway interface system which are communicatively coupled to each other, said method comprising the steps of:
   intercepting an authentication packet transmitted from a client to an intranet server by the gateway interface, wherein that said authentication packet is symmetrically encrypted by the client with a one-time password for transmission from said client to said intranet server;
   verifying said one-time password associated with said authentication packet by the gateway interface based upon a plurality of preassigned one-time passwords either cached or accessed from at least one authentication server; and
   modifying said authentication packet by the gateway interface for acceptance by said intranet server, wherein the response packet that is generated by said intranet server is thereafter intercepted, verified and modified by said gateway interface for transmission back to said client.

6. The method of claim 1 wherein said authentication packet includes a KERBEROS authentication packet and wherein at least one of said authentication servers accessed by the gateway interface is a KERBEROS key distribution center.

7. The method of claim 6 wherein said KERBEROS authentication packet includes a Ticket Granting Ticket (TGT) request.

8. The method of claim 1 wherein the client's one-time password has been paired with a session key and said response packet received from the domain server is re-encrypted by the gateway interface with the client's original one-time password for transmission back to the client.

9. The method of claim 7 wherein the client's one-time password has been paired with a session key and said domain response packet comprises a KERBEROS ticket packet that is re-encrypted by the gateway interface with the client's original one-time password for transmission back to the client.

10. A method in a data network for authenticating identifying data transmitted from a client to a domain server through use of a gateway interface system which are communicatively coupled to each other, said method comprising the steps of:

symmetrically encrypting a KERBEROS preauthentication packet by a client with a one-time password for transmission to a domain server;

intercepting said KERBEROS preauthentication packet transmitted from a client to a domain server by the gateway interface;

verifying said one-time password associated with said preauthentication packet by the gateway interface based upon a plurality of preassigned one-time passwords either cached or accessed from at least one authentication server and pairing a session key therewith;

identifying the transmission sent by the client as a KERBEROS authentication packet and accessing a KERBEROS key distribution center by the gateway interface;

modifying the KERBEROS authentication packet received from said distribution center by the gateway interface for acceptance by said domain server; and intercepting, verifying and modifying by the gateway interface of the KERBEROS response packet generated by said domain server for transmission back to said client, wherein said response packet comprises a KERBEROS response packet that is re-encrypted with the client's original one-time password.

11. The system method of claim 10 wherein said KERBEROS authentication packet comprises a Ticket Granting Ticket (TGT) request.

12. The method of claim 10 further comprising the step of:

encrypting said KERBEROS authentication packet with a known invalid password for transfer to said domain server, if said one-time password utilized by the client is not identified by the gateway interface, such that said domain server generates an error message indicative of said invalid password for transmission back to the client.

13. A gateway interface system in a data network for authenticating identifying data transmitted from a client to a domain server which are communicatively coupled to each other through said system, said system comprising:

an encryption module which the client uses to symmetrically encrypt an authentication packet with a one-time password for transmission from a client to a domain server;

an interception module which the gateway interface uses to intercept said authentication packet transmitted from said client to said domain server;

a verification module which the gateway interface uses to verify said one-time password associated with said authentication packet based upon a plurality of preassigned one-time passwords either cached or accessed from at least one authentication server; and a modification module which the gateway interface uses to modify said authentication packet for acceptance by said domain server, wherein the response packet that is generated by said domain server is thereafter intercepted, verified and modified by said gateway for transmission back to the client.

14. The system of claim 13 wherein said modification module further comprises:

an identification module which the gateway interface uses to encrypt said authentication packet with a valid password to establish a protected transmission for the transfer of known security information as necessary to identify the client and permit access to said domain server.

15. The system of claim 13 wherein said authentication packet is re-encrypted with a known invalid password by the gateway interface for transfer to said domain server, such that said server generates an error message indicative of said invalid password for transmission back to the client, if said one-time password utilized by the client is not identified.

16. The system of claim 14 wherein said identification module used by the gateway interface to encrypt said authentication packet with a valid password for transfer to said domain server involves encryption with a shared secret that is expected by such server as a valid password for a given client.

17. The system of claim 13 wherein each of said modules further comprises signal-bearing media.

18. The system of claim 13 wherein the client's one-time password has been paired with a session key and said response packet received from the domain server is re-encrypted by the gateway interface with the client's original one-time password for transmission back to the client.

19. A gateway interface system in a local area network for authenticating identifying data transmitted from a client to an intranet server which are communicatively coupled to each other through said system, said system comprising:

an encryption module which the client uses to symmetrically encrypt an authentication packet with a one-time password for transmission from a client to an intranet server;

an interception module which the gateway interface uses to intercept said authentication packet transmitted from said client to said intranet server;

verification module which the gateway interface uses to verify said one-time password associated with said authentication packet based upon a plurality of preassigned one-time passwords either cached or accessed from at least one authentication server; and a modification module which the gateway interface uses to modify said authentication packet for acceptance by said intranet server, wherein the response packet that is generated by said intranet server is thereafter intercepted, verified and modified by said gateway for transmission back to the client.

20. The system of claim 11 wherein said response packet received from the domain server comprises a KERBEROS response packet that includes the requested TGT.

* * * * *